May 3, 1932. A. A. LEASE ET AL 1,856,220
BORE HOLE SURVEYING INSTRUMENT
Filed July 3, 1930
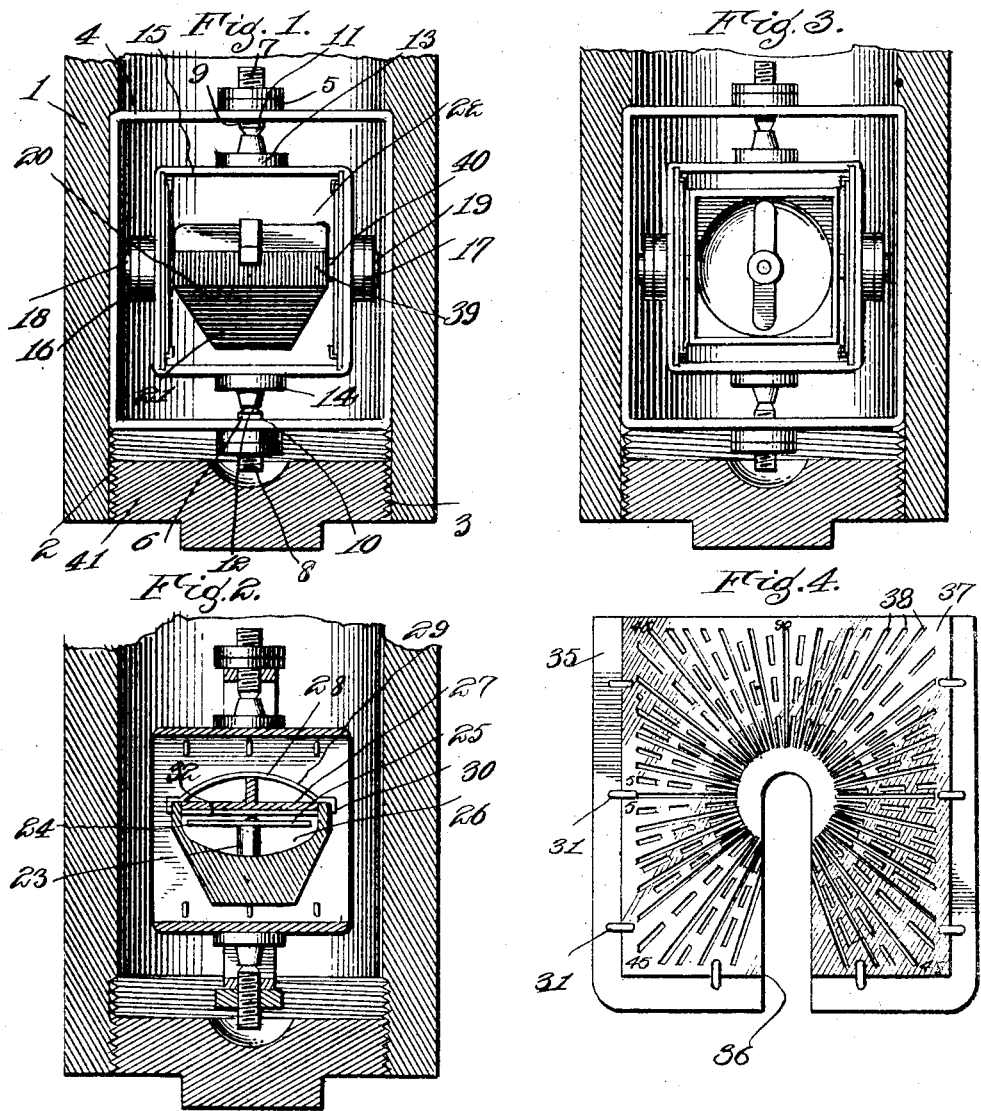
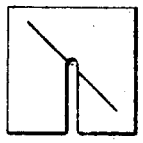
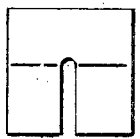
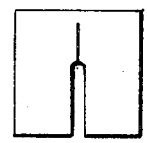
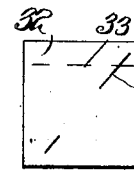
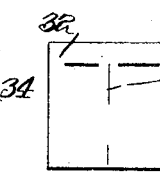
INVENTORS
A. A. Lease
J. F. Peters, Jr.
BY
ATTORNEY
WITNESS Patented May 3, 1932

1,856,220

UNITED STATES PATENT OFFICE

ART A. LEASE AND JOSEPH F. PETERS, JR., OF LEAD, SOUTH DAKOTA

BORE HOLE SURVEYING INSTRUMENT

Application filed July 3, 1930. Serial No. 465,694.

This invention relates to an improvement in instruments for surveying bore holes and is designed more particularly as an improvement over Patent No. 1,684,337 to L. B. Wright, et al., dated September 11, 1928 and consists in the combinations and arrangements and construction herein defined.

An object of our invention is to provide a bore hole surveying instrument that will give a direct reading of the depression angle without computation and other operations necessary in usual bore hole surveying instruments.

A further object of our invention is to provide a bore hole surveying instrument that will give a direct reading of the direction of the bore without computation or other operations usually required.

A further object of the invention is to provide a device of the type described which has very few parts, is easy to manufacture and will not get out of order easily.

Other objects and advantages will appear as the specification proceeds and the invention will be more particularly defined in the appended claims.

Our invention is illustrated in the attached drawings forming a part of this specification, in which Figure 1 is a sectional elevational view through my device with parts thereof being shown in elevation;

Figure 2 is a sectional elevational view through our device at right angles to the view shown in Fig. 1;

Figure 3 is a sectional view through our device with parts thereof in elevation and the movable parts in one operative position;

Figure 4 is an elevational view of a portion of the device;

Figures 5, 6 and 7 are schematic representations of a portion of the device;

Figures 8 and 9 are diagrammatic views of another portion of the device.

In carrying out our invention we make use of an ordinary pipe 1 provided with a pair of longitudinal grooves 2 and 3 diametrically opposite to one another in the inner wall thereof. In these grooves we place a frame 4 having sides having bearing bosses 5 and 6 thereon. Threadedly mounted in these bearing bosses 5 and 6 are the pins 7 and 8 providing suitable bearing pivots 9 and 10 engaging bearing sockets 11 and 12 in projecting bearing members 13 and 14 integral with the inner frame member 15. As appears from an examination of Fig. 1 and Fig. 3 these frame members are rectangular in shape.

This inner frame member 15 is also provided with bearing bosses 16 and 17, threadedly mounting the pivot pins 18 and 19. These bearing bosses 16 and 17 and pivot pins 18 and 19 are exactly similar in construction to the bosses 5 and 6 and pivot pins 7 and 8 of frame 4 as appears from Figures 1 and 3. Suitably mounted by socket means similar to socket means 11 and 12 is the pendulous body 20 constructed substantially in the form of an inverted truncated pyramid. The lower portion 21 of this body 20 is weighted so that the top flat surface 22 thereof is maintained in a horizontal plane no matter what the position of the supporting frames.

In position within and at the center of this body 20 is a post 23 providing a mounting for a compass needle 24 having a radio active substance 25 on the top thereof, and for a purpose soon to appear. To close the opening 26 in the body 20, the cover 27 equipped with the handle 28 and spring fastening means 29 adapted to engage the top portions 30 of the body 20, is provided. The under side of this cover 27 has suitable fastening means of any conventional form, but preferably of the form shown at 31 in Figure 4 for securing a film sheet 32 therebeneath. This film sheet 32 is adapted to register an impression made by the radio active substance on the top of the compass needle. This film sheet 32 has thereon the reference line 33 which cooperates with the impression shown at 34 on said sheet made by the radio active substance 25 on top of the compass needle 24 to indicate the direction of the bore hole in a manner to be hereinafter set forth.

For indicating the angle of depression of the bore hole, we provide the following means. Placed about the pins 18 and 19 are the film holding plates 35 having the slots 36 for securing this engagement. These film holding plates 35 are provided with the film sheet securing means 31 similar to the film sheet securing means used for mounting in place film sheet 32. The film plates 37 are provided with suitable scale markings 38 dividing the surface thereof into angles of 5°, as clearly appears in Figure 4. These scale markings are provided with numerals indicating the degree of the angle in the well known manner.

For registering the angle of depression on these film sheets, the slot 39 provided adjacent the flat top portion 22 in the body 20, filled with a radio active substance 40 is provided. This slot runs about the entire circumference of the body 20.

For securing the operating parts of our instrument in the pipe member 1, a suitable plug 41 is provided threadedly mounted therein and which excludes dirt, water, and other extraneous matter.

From the above description, the operation of our device is easily understood. The pipe 1 is lowered into the bore hole with the frame 4 and contained parts positioned therein and suitably sealed by plug 41 as appears in Figures 1 and 3. It is evident that the frame 4 will be turned with the pipe 1 and that the body 20 with attached frame 15 will be turned therewith. This will cause a relative movement between the film sheet 32 and the compass needle 24 which, of course, always points to the magnetic north, thereby impressing upon the film sheet 32 the line 34 which, taken in connection with reference line 33, indicates the angular relation of the direction of the bore hole with a line running through the magnetic north. The body 20 being weighted at the base thereof will maintain the grooves 39 containing the radio active substance 40 in a horizontal plane, while the film plate 37 will be tilted at an angle relative to the horizontal which indicates the angular relation or depression of the bore hole relatively to the horizontal. It is thereby seen that we have provided a bore hole surveying instrument which gives correct readings of the direction angle without figuring or computation of any nature.

What we claim, therefore, and desire to secure by Letters Patent is:

1. A bore hole surveying instrument comprising means for measuring the depression angle of the bore hole and means for measuring the direction angle of the bore hole, said means for measuring the direction angle being contained within said depression angle measuring means, and sealably separated therefrom.

2. A bore hole surveying instrument comprising a casing, a frame mounted therein, a second frame, means for pivoting said second named frame within said first named frame, films carried by said second frame, and a pendulous body mounted within said second frame and having radio active substance thereon for making an impression on said films.

3. A bore hole surveying instrument comprising a casing having slots, a rectangular frame mounted in said slots, pivot bearings carried by said frame, a frame member pivotally mounted upon said bearings, film sheets carried by said last named frame, a pendulous body mounted within said last named frame and adapted to maintain a horizontal position throughout the operation, and said pendulous body having radio active substance thereon for making an impression on said film sheets.

4. A bore hole surveying instrument comprising a casing having slots, a frame mounted in said slots, pivot bearings carried by said frame, a frame member pivotally mounted upon said bearings, a pendulous body mounted within said last named frame, said pendulous body having a recess, a compass needle mounted therein having a radio active substance upon the upper surface thereof, a closure for said recess, a film carried by said closure and adapted to register the impression of said radio active substance to indicate the angle of said bore hole, film sheets carried by said second named frame member and movable therewith, and said pendulous body having a radio active substance for registering impressions on said film sheets to indicate the angle of depression.

ART A. LEASE.
JOSEPH F. PETERS, Jr.